United States Patent
Jimbo

(10) Patent No.: US 8,702,556 B2
(45) Date of Patent: Apr. 22, 2014

(54) UNIDIRECTIONAL CLUTCH

(75) Inventor: Naoto Jimbo, Yokohama (JP)

(73) Assignee: Nifco Inc., Yokohama-shi (JP)

( * ) Notice: Subject to any disclaimer, the term of this patent is extended or adjusted under 35 U.S.C. 154(b) by 276 days.

(21) Appl. No.: 13/381,253

(22) PCT Filed: Jun. 10, 2010

(86) PCT No.: PCT/JP2010/003868
§ 371 (c)(1),
(2), (4) Date: Feb. 6, 2012

(87) PCT Pub. No.: WO2011/001608
PCT Pub. Date: Jan. 6, 2011

(65) Prior Publication Data
US 2012/0125729 A1     May 24, 2012

(30) Foreign Application Priority Data
Jun. 30, 2009  (JP) ................. 2009-155687

(51) Int. Cl.
*F16D 41/02* (2006.01)
*B62M 11/14* (2006.01)

(52) U.S. Cl.
USPC ........... 475/294; 475/297; 475/305; 475/331; 192/41 R

(58) Field of Classification Search
USPC ............... 475/294, 297, 305, 331; 192/41 R
See application file for complete search history.

(56) References Cited

U.S. PATENT DOCUMENTS

| | | | |
|---|---|---|---|
| 1,610,794 A | 12/1926 | Keller, Sr. | |
| 2,333,680 A | 11/1943 | Schneider et al. | |
| 3,246,726 A | 4/1966 | Richardson | |
| 3,554,339 A | 1/1971 | Richardson | |
| 4,069,725 A * | 1/1978 | Segawa | 475/297 |
| 4,262,785 A | 4/1981 | Anderson et al. | |
| 4,862,009 A * | 8/1989 | King | 290/22 |
| 6,931,954 B2 * | 8/2005 | Jinbo | 74/64 |
| 2005/0130794 A1 | 6/2005 | Jinbo | |

FOREIGN PATENT DOCUMENTS

| | | |
|---|---|---|
| JP | S58-53943 U | 4/1983 |
| JP | 2005-172199 | 6/2005 |
| JP | 3862360 | 12/2006 |

OTHER PUBLICATIONS

European Patent Office, "European Search Report for EP 10 79 3784" Jan. 7, 2013.

* cited by examiner

*Primary Examiner* — Roger Pang
(74) *Attorney, Agent, or Firm* — Manabu Kanesaka

(57) ABSTRACT

[Object] A unidirectional clutch can reduce a backlash without increasing the number of components, and also can improve silence and durability.
[Means of Solving Problem] In a planet gear member 4 including a planet gear 4a which meshes an internal gear 2b of an outer member 2, locking teeth 4b are provided coaxially and integrally relative to the planet gear through a flange 4c. In an inner member 3, U-shaped wall portions 3b receiving the locking teeth 4b are provided. In the U-shaped wall portion, an engaging portion 5 is provided so that teeth of one portion of the locking teeth can engage. A locked state is attained by the locking teeth, so that even if the planet gear receives a restriction of the number of teeth, the number of the teeth (pitch) of the locking teeth can be finely set arbitrarily. Accordingly, an interval of the locked state accompanied by a rotation of the planet gear member becomes fine so as to be capable of reducing the backlash in the unidirectional clutch without increasing the number of components.

7 Claims, 5 Drawing Sheets

UNIDIRECTIONAL CLUTCH

RELATED APPLICATIONS

The present application is National Phase of International Application No. PCT/JP2010/003868 filed Jun. 10, 2010, and claims priority from Japanese Application No. 2009-155687, filed Jun. 30, 2009.

FIELD OF TECHNOLOGY

The present invention relates to a unidirectional clutch, especially, the unidirectional clutch suitable for preventing a drive side from being driven in reverse from a load side.

BACKGROUND ART

Conventionally, there are various kinds of mechanical devices in which the unidirectional clutch is used. For example, in a paper handling mechanism for a copy machine, in order to prevent problems for the removing a paper at a time of a paper jam, there is provided the unidirectional clutch between a paper conveyance roller and a drive motor.

As for the unidirectional clutch, there is a well-known unidirectional clutch (for example, see Japanese Patent Documents 1 and 2) comprising an outer member including an internal gear; an inner member received in the outer member coaxially and freely rotatably, and also including a concave portion on an outer circumferential portion thereof; and a planet gear received freely rotatably in the concave portion, and meshing the internal gear. An engaging portion is provided in a concave portion side in such a way that at a time of a rolling movement in one direction of the planet gear which rolls and moves by a relative rotation of the outer and inner members, teeth of one portion of the planet gear engage; however, at a time of a rolling movement in the other direction, the engagement is released, so that torque is transmitted in one direction of the relative rotation of the outer and inner members, and the torque is not transmitted in the other direction.

PRIOR ART DOCUMENT

Patent Document

Patent Document 1: Japanese Patent Publication No. 3862360

Patent Document 2: Japanese Unexamined Patent Publication No. 2005-172199

SUMMARY OF THE INVENTION

Problems to be Solved by the Invention

In the aforementioned Patent Document 1, in order to reduce a backlash in the unidirectional clutch, there are provided a plurality of projections including an interval which is narrower than an interval of adjacent teeth of the planet gear, and is wider than a tooth thickness of a tooth end portion, on a concave surface of the concave portion. However, a shape of the projections comes to be a small projection by receiving a restriction of a movement amount between positions of an engagement and a non-engagement of the planet gear, thereby having a problem that there is difficulty for a molding property.

Also, as for the unidirectional clutch in the Japanese Patent Document 2, in order to improve silence and durability in a portion in which the planet gear rotates while teeth ends are sliding and contacting the concave surface of the concave portion, there is provided a movement-range defining device (a guide) of the planet gear in such a way that the teeth ends do not hit the concave surface of the concave portion at a time of a free rotation of the planet gear. Thereby, the silence and the durability improve. However, since a separate component is provided for guiding, there is a problem that the number of components increases or the unidirectional clutch grows in size.

Means for Solving the Problems

In order to solve the aforementioned problems, and provide a unidirectional clutch capable of reducing a backlash and also improving silence and durability without increasing the number of components, the present invention is a unidirectional clutch comprising a first member (2) including an internal gear; a second member (3) coaxially supported relative to the first member freely rotatably, and including a concave portion which is open toward teeth of the internal gear; and a planet gear member (4) rotatably received inside the concave portion, and including a planet gear meshing the internal gear. The planet gear member includes an extension portion provided coaxially and integrally with the planet gear, and on an outer circumference of the extension portion, there are provided locking teeth engaging with the engaging portion. The locking teeth are disposed in a pitch higher than teeth of the planet gear, and only when the first member and the second member attempt to relatively rotate in one direction, the second member includes the engaging portion engaging with one portion of the planet gear member.

According to the above, only when the first member and the second member attempt to relatively rotate in one direction, the locking teeth of the planet gear member engage the engaging portion, and the first and second members come to a locked state as the unidirectional clutch. However, the locked state is attained not by engaging with the teeth of the planet gear, which meshes the internal gear, with the engaging portion, but by engaging with the locking teeth, which are provided on the outer circumference of the extension portion provided coaxially and integrally with the planet gear of the planet gear member, with the engaging portion. Accordingly, by setting the locking teeth in the pitch higher than the teeth of the planet gear, the backlash in the unidirectional clutch can be reduced.

Especially, preferably, the second member (3) includes an axis member and/or a disk member, and the concave portion is defined by a wall member which is connected to at least one of an outer circumference of the axis member or an end surface in an axis line direction of the disk member. According to the above, for example, in a case where the second member is molded by resin, the wall member can be easily formed by integral molding. Also, the wall member is connected at least to the axis member or the disk member, so that strength of the wall member can be easily ensured.

Moreover, preferably, the engaging portion is provided in the wall member. According to the above, in a case where the locking teeth are engaged with the engaging portion, due to a wall surface of the wall member, the locking teeth can be guided up to the engaging portion further appropriately. Also, preferably, on a side wherein the engaging portion of the wall member is provided, there is notched a portion facing one side portion of the planet gear. According to the above, in a case where the planet gear is guided by the wall member, the portion facing one side portion of the planet gear is notched, so that the teeth of the planet gear never hit at a time of a rotation to improve the silence and durability.

Also, preferably, in a portion between the planet gear and the locking teeth of the planet gear member, there is coaxially provided a flange. According to the above, the teeth of the planet gear can be formed integrally with the flange to enhance the strength of the teeth of the planet gear. Also, in the rotation of the planet gear, an outer circumferential surface of the flange is slid and contacted with a concave surface of the concave portion, so that both smooth surfaces come to slide and contact to improve the silencing at a time of a rolling movement of the planet gear member.

Moreover, preferably, the flange is formed with the same or slightly larger diameter than that of a circle of teeth ends of the planet gear. According to the above, the planet gear can be integrally formed with the flange up to the teeth ends of the planet gear. Also, the teeth of the planet gear can be reliably prevented from sliding and contacting with the concave surface of the concave portion to improve the durability and the silencing further.

Also, preferably, the locking teeth are formed in a sawtooth shape, and teeth surfaces of the locking teeth, which engage the engaging portion, are approximately perpendicular to a pitch circle direction of the locking teeth. According to the above, an engaging direction of the locking teeth and the engaging portion comes to approximately correspond to a rotational direction of the planet gear member, so that a strength at a time of locking increases, and if the strength at the time of locking is the same, a size of the locking teeth and the engaging portion can be reduced.

Effect of the Invention

Thus, according to the present invention, the planet gear member is formed in such a way as to include the planet gear meshing the internal gear of the outer member, and the extension portion provided coaxially and integrally to the planet gear. In the extension portion, there are disposed the locking teeth with the pitch higher than the teeth of the planet gear so as to attain the locked state, so that the locking teeth can be disposed with a high pitch without receiving a restriction of the number of the teeth of the planet gear, and an interval in the locked state accompanied by a rotation of the planet gear member becomes fine to reduce the backlash in the unidirectional clutch without increasing the number of components. Also, the locked state is not attained by engaging with the planet gear, so that the strength of the teeth of the planet gear can be a requisite minimum to downsize.

BEST MODES OF CARRYING OUT THE INVENTION

Figure 1:
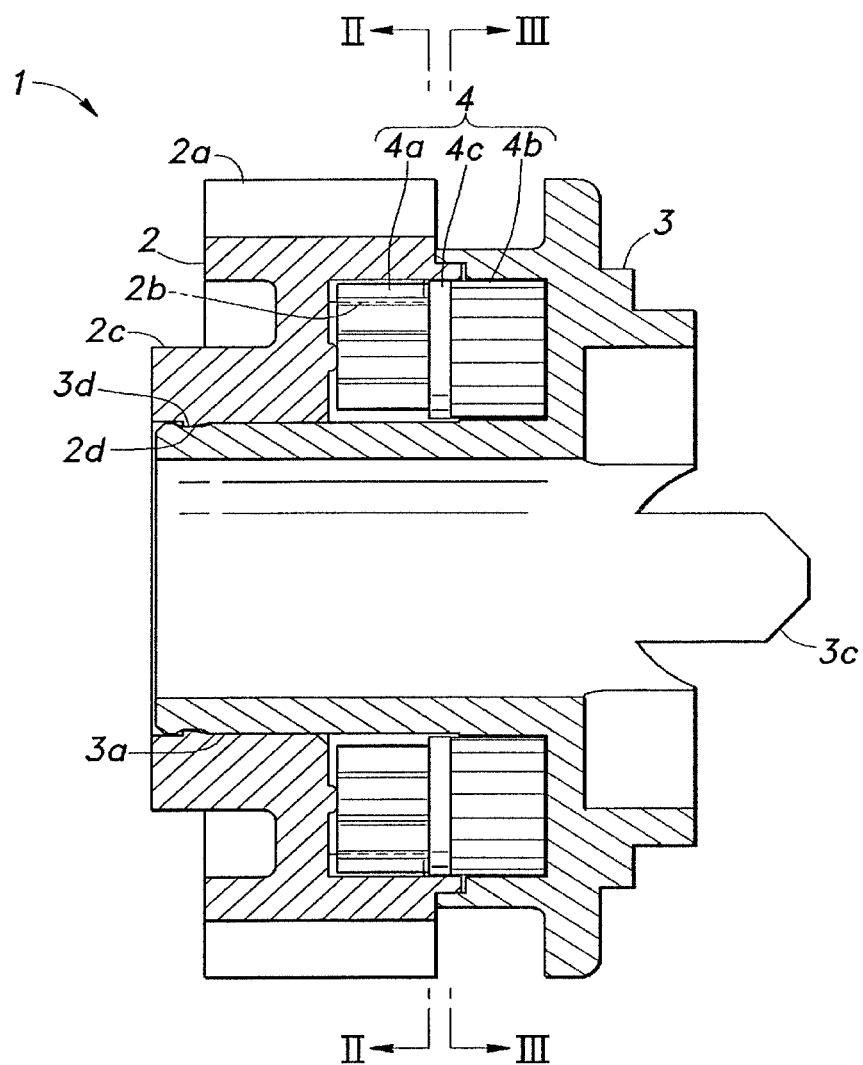
FIG. 1 is a broken cross-sectional view showing along an axis line direction of a unidirectional clutch based on the present invention.
Figure 2:
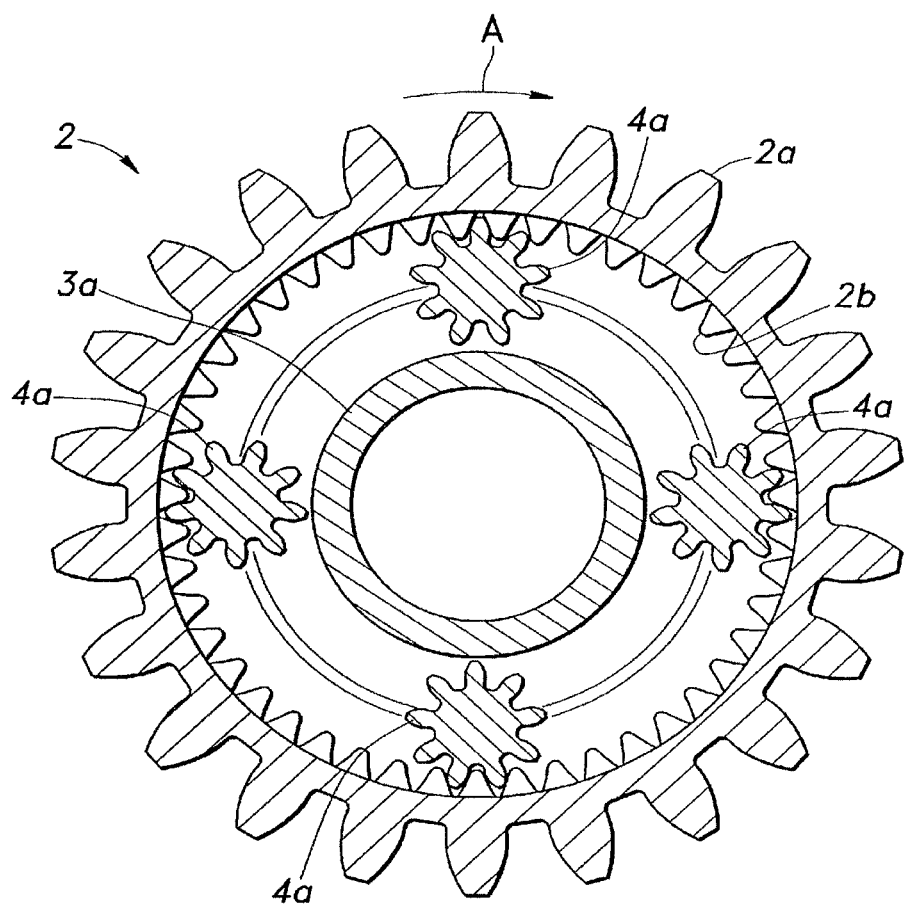
FIG. 2 is an arrow view taken along a line II-II in FIG. 1.
Figure 3:
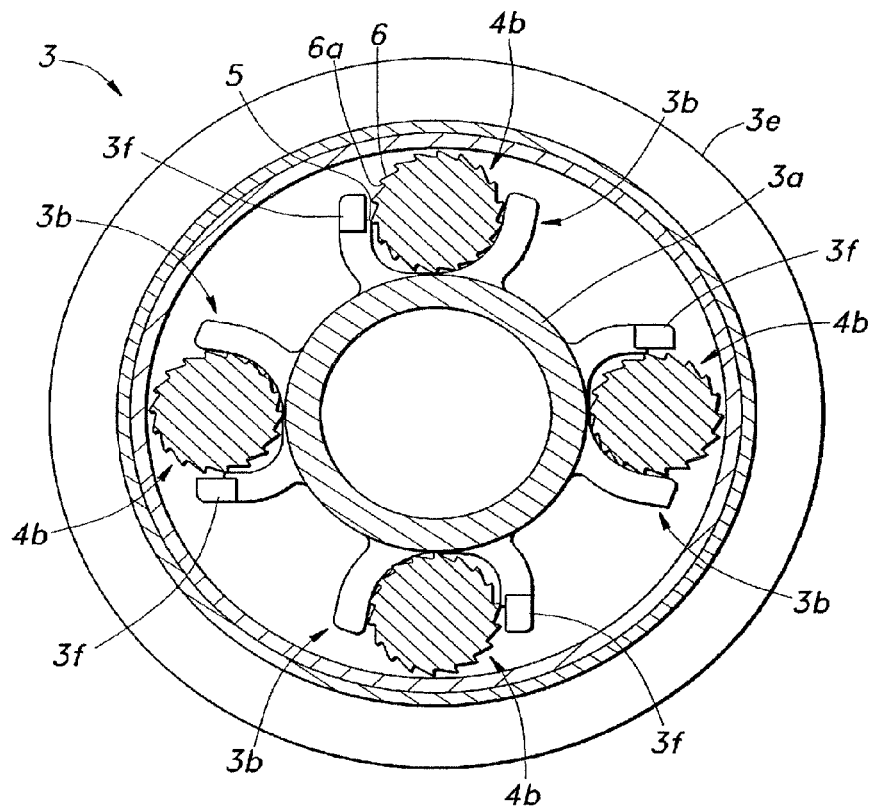
FIG. 3 is an arrow view taken along a line III-III in FIG. 1.
Figure 4:
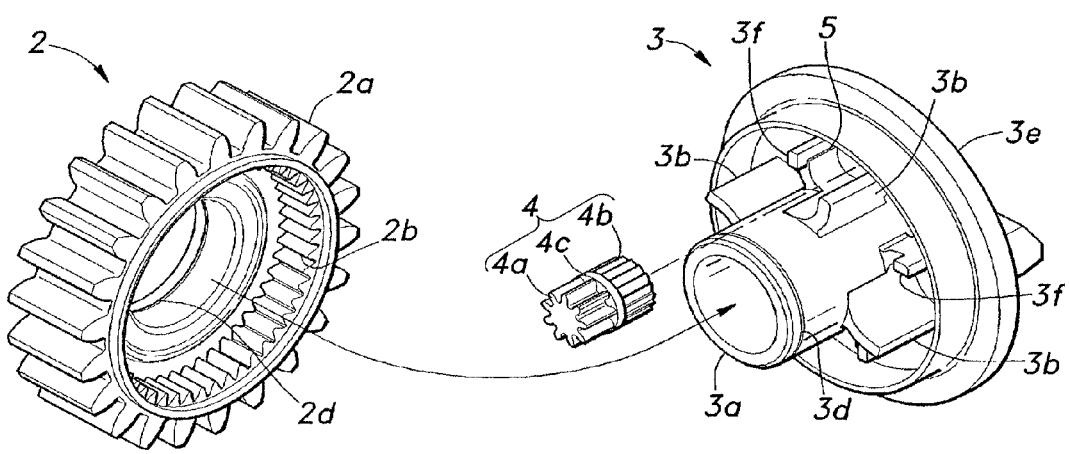
FIG. 4 is an exploded perspective view of an assembly showing constituent elements of the unidirectional clutch.

Hereinafter, an embodiment of the present invention will be explained with reference to drawings. FIG. 1 is a broken cross-sectional view showing along an axis line direction of a unidirectional clutch based on the present invention. FIG. 2 is an arrow view taken along a line II-II in FIG. 1; FIG. 3 is an arrow view taken along a line III-III in FIG. 1; and FIG. 4 is an exploded assembly perspective view showing constituent elements of the unidirectional clutch. Incidentally, the unidirectional clutch may be provided in, for example, a paper handling mechanism for a printer.

A unidirectional clutch 1 of an illustrated example comprises an outer member 2 as a first member; an inner member 3 as a second member; and in the illustrated example, four pieces of planet gear members 4 installed between both the members 2 and 3. The respective members 2, 3, and 4 may be formed by integrally molding a synthetic resin material.

As shown in FIG. 2 as well, the outer member 2 includes an external gear 2a, which is connected by a gear to a motor which is not illustrated in the figures, on an outer circumferential surface; and an internal gear 2b on an inner circumferential surface. The outer member 2 is formed in a cylinder shape with a shallow bottom. Incidentally, on an outside of a bottom portion, there is formed an annular boss portion 2c coaxially protruding outward.

As shown in FIG. 3, the inner member 3 is formed in a cylinder shape with a shallow bottom including an annular torso portion 3a as an axis member relatively supported by the annular boss portion 2c of the outer member 2 freely rotatably in an inserted state to pass through; four U-shaped wall members 3b connected to the annular torso portion 3a, disposed on an outer circumferential surface thereof at intervals of ninety degrees, and defining a concave portion opening outward in a radial direction, i.e., toward teeth of the internal gear 2b; and a pair of engaging projections 3c for a torque transmission formed on an end surface of an outside in the axis line direction. Incidentally, in the illustrated example, a coaxial disk member 3e is integrally formed in an end in the axis line direction of the annular torso portion 3a, and one portion (a disk member 3e side) of the wall members 3b is connected to the disk member 3e as well. Thereby, combined with a connection to the aforementioned annular torso portion 3a, a strength of the wall members 3b increases. However, the wall members 3b may be connected to only one of the annular torso portion 3a or the disk member 3e. Also, due to a support axis which is not shown in the figures and inserted to pass through a through bore of the annular torso portion 3a, the inner member 3 is supported freely rotatably, and as described above, the outer member 2 is relatively supported relative to the inner member 3 freely rotatably.

Only one planet gear member 4 is illustrated in FIG. 4 as a representative. However, as shown in the figure, the planet gear member 4 is formed in such a way as to respectively coaxially include planet gears 4a meshing the internal gear 2b of the outer member 2; locking teeth 4b received in the U-shaped wall members 3b of the inner member 3; and a flange 4c provided between the planet gear 4a and the locking teeth 4b, and including a cylindrical surface. In the planet gear member 4, there are formed an extension portion coaxially and integrally with the planet gears 4a, and on an outer circumference thereof, there are provided the flange 4c and the locking teeth 4b. Incidentally, an outer diameter of the flange 4c is made slightly larger than that of a circle of teeth ends of the planet gear 4a. However, the outer diameter of the flange 4c may have the same diameter of the circle of the teeth ends of the planet gear 4a. In a similar fashion, the outer diameter of the flange 4c is also made slightly larger than an outer diameter thereof relative to the locking teeth 4b. However, the outer diameter of the flange 4c may have the same diameter of the outer diameter of the locking teeth 4b. In doing the above this way, in a structure of rotating and supporting the flange 4c by the wall member 3b, a shape of a curved supporting surface of the wall member 3b may be formed in a surface without a concavity and convexity so as to be capable of easily forming.

A tooth width of the internal gear 2b of the outer member 2 has a length corresponding to a tooth width of the planet gear 4a of the planet gear member 4. The flange 4c adjacent to the planet gear 4a is received in an inner member 3 side in an assembly state. The locking teeth 4b are formed in a sawtooth shape in a cross-sectional surface form. Also, the locking teeth 4b are provided with the double or more number (a pitch higher than the teeth of the planet gear) of the number of teeth of the planet gear 4a.

A width (a length in the same direction of the axis line direction of the inner member 3) of one wall of the U-shaped wall member 3b is formed with a short width which becomes the length combining the locking teeth 4b and the flange 4c in a length in the axis line direction of the planet gear member 4. A width of the other wall of the wall member 3b is formed with a long width having the approximately same length as an entire length (the length in the axis line direction) of the planet gear member 4. An inner width in the same direction as a circumferential direction of the inner member 3 of the wall member 3b is set in a length wherein the locking teeth 4b, which are received in the wall member 3b, are allowed to move only slightly in the circumferential direction of the inner member 3.

Then, on one wall of the aforementioned short width of the U-shaped wall member 3b, there is provided an engaging portion 5 on an inner circumferential surface of the wall member 3b. In the illustrated example, the engaging portion 5 comprises a step portion which is formed by digging a portion corresponding to one wall of the inner circumferential surface, which forms a U shape as a whole of the wall member 3b, outward in the radial direction, and by removing an open side of the U shape. In a case where the planet gear member 4 rotates inside the U-shaped wall member 3b to an engaging portion 5 side, one portion (one) of the locking teeth 4b, which is one portion of the extension portion of the planet gear member 4, is allowed to engage the engaging portion 5.

Also, in one wall (a wall of short width) of the wall member 3b, there is notched a portion facing one side portion of the planet gear 4a of the planet gear member 4 in a state of being received in the wall member 3b. Due to a notch thereof, in a case where the planet gear member 4 rotates in a direction wherein the locking teeth 4b engage the engaging portion 5, even if the planet gear member 4 inclines and the planet gear 4a comes to precede the locking teeth 4b, the planet gear 4a does not contact one wall of the wall member 3b so as to carry out an engagement between the locking teeth 4b and the engaging portion 5 reliably.

Incidentally, on one wall of the wall member 3b, there is provided an arm 3f extended to an outer member 2 side from a portion provided in the engaging portion 5 with a length corresponding to a width of the flange 4c. The arm 3f is provided in a position wherein an outer circumferential surface of the flange 4c slides and contacts in the case where the planet gear member 4 rotates in the direction wherein the locking teeth 4b engage the engaging portion 5. Thereby, in the case where the planet gear member 4 rotates in the direction wherein the locking teeth 4b engage the engaging portion 5, as shown with a chain double-dashed line in FIG. 7, in order to allow the arm 3f and the flange 4c to slide and contact, it is not necessary to guide the locking teeth 4b any more by sliding and contacting teeth ends of the locking teeth 4b with a wall surface of the wall member 3b so as to prevent damage from the teeth ends of the locking teeth 4b. Also, a length (a length in a direction corresponding to a rotational direction of the gear member 4) in a circumferential direction of the arm 3f is made as short as possible within a range which can ensure a strength to prevent a sliding and contacting sound between the arm 3f and the flange 4c as well.

Figure 5:
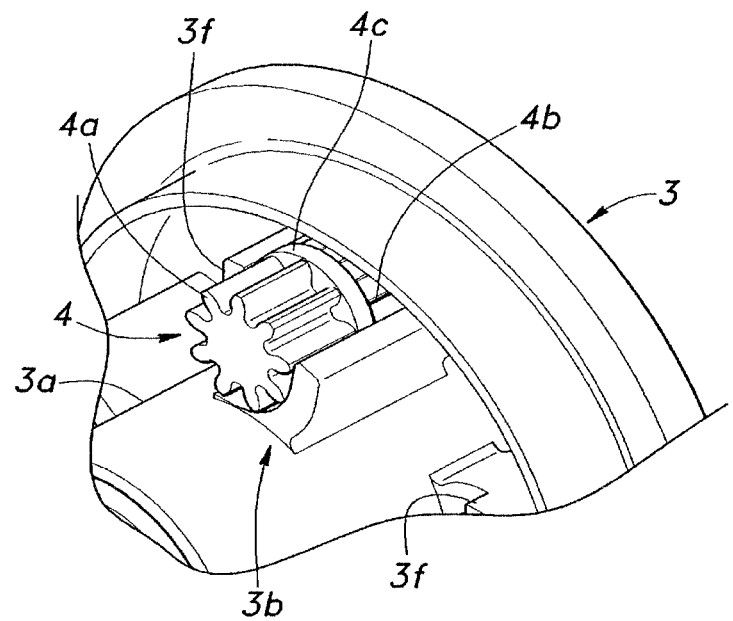
FIG. 5 is an enlarged perspective view of essential parts showing a state wherein a planet gear member is assembled in an inner member.

Next, a point of assembling each member 2, 3, and 4 will be explained. As shown in FIG. 5, the locking teeth 4b of the planet gear member 4 are placed in a state of being received in the U-shaped wall member 3b of the inner member 3. The annular boss portion 2c of the outer member 2 is fitted and placed into the annular torso portion 3a of the inner member 3 in such a way as to overlay the outer member 2 with the same axis relative to the inner member 3 in the aforementioned state (FIG. 6).

Figure 6:
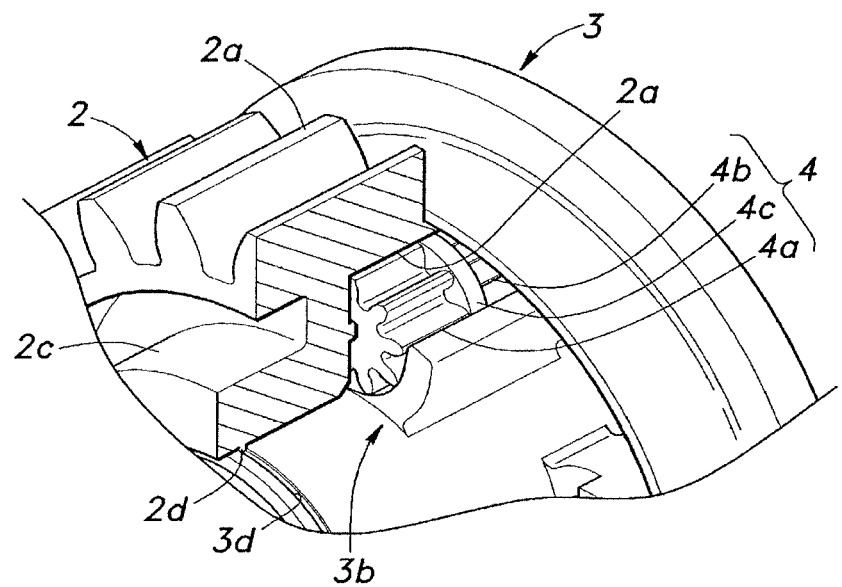
FIG. 6 is an enlarged perspective view of essential parts showing a state wherein an outer member is assembled in FIG. 5.

In a fitted and placed state in FIG. 6, the planet gear 4a of each planet gear member 4 meshes the internal gear 2b of the outer member 2. Also, on an inner circumferential surface of the annular boss portion 2c and an outer circumferential surface of the annular torso portion 3a, there are provided a circumferential-directional projecting piece 2d and a circumferential-directional groove 3d mutually fitted in a state wherein the outer member 2 and the inner member 3 mutually face coaxially, and overlap. As shown in FIG. 6, due to a concave-convex engagement between the circumferential-directional projecting piece 2d and the circumferential-directional groove 3d, the outer member 2 and the inner member 3 are mutually relatively rotatable. However, the outer member 2 and the inner member 3 are integrally assembled in a state of being retained in the axis line direction.

Figure 7:
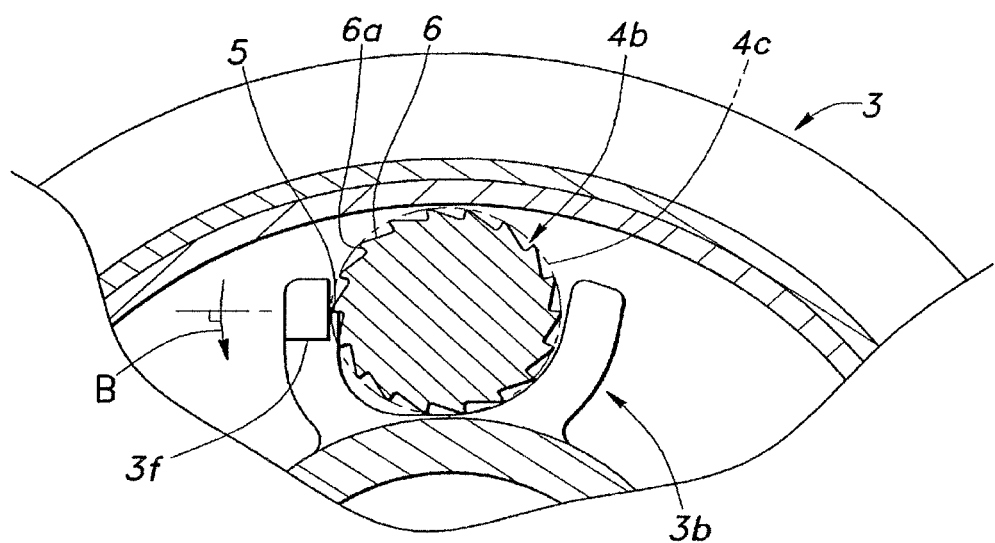
FIG. 7 is an enlarged front view of essential parts showing an engaged state of a locking teeth portion.

In the unidirectional clutch 1 assembled in the aforementioned manner, in a case where the outer member 2 attempts to relatively rotate toward an arrow A in FIG. 2 relative to the inner member 3, the planet gear member 4, wherein the planet gears 4a are meshing the internal gear 2b, rotates in an arrow A direction. Thereby, as shown in FIG. 7, one portion of the locking teeth 4b engages the engaging portion 5, and a rotation of the planet gear member 4 is halted, so that the outer member 2 and the inner member 3 mutually come to a locked state. In a case where the outer member 2 is driven by the motor, a motor torque is transmitted to the inner member 3, and for example, a paper handling roller (not shown in the figures) connected to the inner member 3 rotates.

Conversely, in a case where the torque, which is attempting to rotate toward the arrow A in FIG. 2 by a tensional force applied to a paper at a shutdown time of the aforementioned paper handling roller, acts on the inner member 3, the inner member 3 relatively rotates toward the arrow A relative to the outer member 2, so that the planet gear member 4 rotates in such a way that the engaging portion 5 precedes relative to the locking teeth 4b, and an engaged state between the locking teeth 4b and the engaging portion 5 is released so as to release the locked state of the unidirectional clutch 1. In that state, the planet gear member 4 comes to be pushed by a long width side of the U-shaped wall member 3b, so that the planet gear member 4 freely rotates while the planet gears 4a are meshing the internal gear 2b.

As mentioned above, the outer diameter of the flange 4c of the planet gear member 4 is larger than that of the circle of the teeth ends of the planet gear 4a, so that in a free rotation state of the aforementioned planet gear member 4, the outer circumferential surface of the flange 4c slides and contacts the inner circumferential surface of the U-shaped wall member 3b. The outer circumferential surface of the flange 4c is formed so as to become a circumference, and regardless of a rotational position of the planet gear member 4, a contact state between the outer circumferential surface of the flange 4c and the inner circumferential surface of the U-shaped wall member 3b consistently stays constant.

As in a case of a conventional structure, in a case where teeth ends of a gear directly slide and contact the inner circumferential surface (a concave surface of a concave portion) of the U-shaped wall member 3b, each angle portion of a polygonal shape corresponding to the number of teeth comes to the same fashion as sliding and contacting. In that case, due to the rotational position of the planet gear member 4, a level difference occurs so as to come to slide and contact. As a result, a hitting sound arises.

On the other hand, according to the aforementioned structure of the present invention, the outer circumferential surface of the flange 4c with the same diameter is allowed to constantly slide and contact, so that the aforementioned hitting sound does not arise to ensure silence.

Also, the flange 4c with a diameter larger than that of the circle of the teeth ends of the planet gear 4a is formed with the planet gear 4a by integral molding, so that a strength of the teeth of the planet gear 4a is enhanced, and even in a case where the diameter of the planet gear member 4 is reduced, the strength of the teeth of the planet gear 4a can be maintained high to downsize the unidirectional clutch 1 without any problem.

Also, in a conventional unidirectional clutch, one portion of the teeth of the planet gear is engaged with an engaging portion provided in a concave portion so as to be in the locked state. In that case, a backlash due to an interval of adjacent teeth of the planet gear has been large.

On the other hand, the teeth of the locking teeth 4b but the planet gear 4a are engaged with the engaging portion 5 so as to be in the locked state, so that the teeth of the locking teeth 4b are allowed to be freely designed by conforming the teeth of the locking teeth 4b in the engaged state. As shown in FIG. 7, a tooth 6 of the locking teeth 4b includes a surface 6a perpendicular to (ninety degrees) a pitch circle direction (an arrow B) of the locking teeth 4b. A surface of a step forming the engaging portion 5 is also formed so as to be perpendicular to (ninety degrees) the pitch circle direction B of the locking teeth 4b in the locked state, and in the locked state, the surface 6a of the tooth 6 of the locking teeth 4b and the surface of the step of the engaging portion 5 mutually meet face-to-face so as to be engaged.

Due to an engagement between the shapes capable of meeting face-to-face in the aforementioned fashion, the torque in the rotational direction of the locking teeth 4b is received by the engaging portion 5 without escaping as a component force. Thereby, even if a shape such as a height of the tooth 6 of the locking teeth 4b and the like is reduced, a sufficient engaging force can be obtained to reduce the height of the tooth 6 and reduce the pitch as well. By forming the locking teeth 4b as mentioned above, the locked state can be attained with a high pitch, so that compared to a conventional structure in which the tooth of the planet gear is engaged so as to be in the locked state, the backlash is reduced. As a result, a unidirectional clutch with a high accuracy and a high quality can be provided.

Also, the planet gear 4a which functions as the planet gear, and the locking teeth 4b which attains the locked state can be formed as the planet gear member 4 which is one member. Since the planet gear member 4 can be formed as one component, the unidirectional clutch can be constituted without changing three components of the conventional outer and inner members, and the planet gear, and the number of the components at all, so that the unidirectional clutch 1 with a small backlash can be attained without increasing the number of the components.

Incidentally, the engaging surface 6a of the tooth 6 of the locking teeth 4b, and the surface of the step of the engaging portion 5 are formed so as to be the surface which respectively becomes ninety degrees relative to the pitch circle direction B of the locking teeth 4b. However, the aforementioned surface is not limited to have ninety degrees, and the surface may have approximately ninety degrees provided that a torque design value in the locked state can be ensured. Thereby, a molding error is allowed to promote a reduction of a processing cost.

Also, the locking teeth 4b are also integrally molded with the flange 4c so as to enhance the strength of the tooth 6, and to improve durability as well. The flange 4c is provided between the planet gear 4a and the locking teeth 4b, and as mentioned above, the outer circumferential surface of the flange 4c is slid and contacted with the inner circumferential surface of the U-shaped wall member 3b. In the locked state, an engaging portion between the engaging portion 5 and the locking teeth 4b, and a meshing portion between the planet gear 4a and the internal gear 2b are mutually out of alignment in the axis line direction of the planet gear member 4. In a lever wherein the engaging portion and the meshing portion become a point of effort and a point of application, a supporting point thereof can become the flange 4c, so that a load never applies to each tooth end of the planet gear 4a or the locking teeth 4b in a unilateral way so as to be capable of preventing an abrasion or a deformation of each tooth due to an excessive load.

INDUSTRIAL APPLICABILITY

The unidirectional clutch according to the present invention can reduce the backlash, and is useful as a unidirectional clutch used for various kinds of devices not only for the paper handling mechanism for the printer.

EXPLANATION OF SYMBOLS 1 a unidirectional clutch
2 an outer member
2b an internal gear
3 an inner member
3b U-shaped wall members
4 planet gear members
4a planet gears
4b locking teeth
4c a flange
5 an engaging portion
6 a tooth
6a a surface

What is claimed is:
1. A unidirectional clutch, comprising:
a first member (2) including an internal gear;
a second member (3) coaxially supported freely rotatably relative to the first member, and including a concave portion which is open toward teeth of the internal gear; and
planet gear members (4) rotatably received inside the concave portion, and including planet gears meshing the internal gear,
wherein the planet gear members include extension portions provided coaxially and integrally with the planet gears, locking teeth are provided on an outer circumference of the extension portion, and are disposed in a pitch higher than teeth of the planet gears, and the second member includes an engaging portion engaging with one portion of the planet gear members only when the first member and the second member attempt to relatively rotate in one direction.

2. A unidirectional clutch according to claim 1, wherein the second member (3) includes an axis member and/or a disk member, and the concave portion is defined by a wall member connected to at least one of an outer circumference of the axis member or an end surface in an axis line direction of the disk member.

3. A unidirectional clutch according to claim 2, wherein the engaging portion is provided in the wall member.

4. A unidirectional clutch according to claim 3, wherein on a side in which the engaging portion of the wall member is provided, a portion facing one side portion of the planet gear is notched.

5. A unidirectional clutch according to claim 1, wherein a flange is coaxially provided in a portion between the planet gear and the locking teeth of the planet gear member.

6. A unidirectional clutch according to claim 5, wherein the flange is formed with a same or slightly larger diameter than that of a circle of teeth ends of the planet gear.

7. A unidirectional clutch according to claim 1, wherein the locking teeth are formed in a saw-tooth shape, and teeth surfaces of the locking teeth, which engage the engaging portion, are approximately perpendicular to a pitch circle direction of the locking teeth.

* * * * *